United States Patent [19]

Eichelburg

[11] 3,997,675

[45] Dec. 14, 1976

[54] CAT FOOD COATED WITH ASCOMYCETUS OR ASPOROGENOUS YEASTS

[76] Inventor: Robert James Eichelburg, Woodland Road, Pound Ridge, N.Y. 10576

[22] Filed: Mar. 5, 1974

[21] Appl. No.: 448,208

[52] U.S. Cl. .................................. 426/92; 426/96; 426/289; 426/534; 426/805
[51] Int. Cl.² ................... A23B 4/00; A23L 1/216; A23K 1/18
[58] Field of Search ................. 426/60, 62, 92, 94, 426/96, 141, 175, 289, 293, 295, 204, 221, 222, 534, 650, 805

[56] References Cited

UNITED STATES PATENTS

| | | | |
|---|---|---|---|
| 2,764,487 | 9/1956 | Wickerham | 426/60 |
| 2,946,688 | 7/1960 | Rosenthal et al. | 426/60 |
| 3,713,976 | 1/1973 | Bunting et al. | 426/60 |
| 3,830,798 | 8/1974 | Herndon et al. | 426/175 |

*Primary Examiner*—Jack Sofer

[57] ABSTRACT

The palatability of dry animal food is improved by coating such food with yeast such as ascomycetous yeasts or asporogenous yeasts. In one embodiment dry animal food kibs are coated with either *Torulopsis utilis* or *Saccharomyces cervisiae*.

7 Claims, No Drawings

CAT FOOD COATED WITH ASCOMYCETUS OR ASPOROGENOUS YEASTS

BRIEF SUMMARY OF THE INVENTION

The palatability of dry animal food is improved by coating such food with yeast such as ascomycetous yeast or asporogenous yeast. In one embodiment, the palatability of dry animal food kibs such as dry dog or cat food kibs is improved by coating such kibs with yeasts comprising either *Torulopsis*, *Candida*, or Saccharomyces. The yeast-like genera belonging to the order Ustilaginales (in the Basidiomycetes) and the yeast-like genera belong to the family Sporobolomycetaceae are also within the broad scope of the invention. An outstanding feature of the invention is that the yeasts suitable for improving the palatability of dry animal food are high in essential B vitamins and proteins. The coated animal food of the invention may also be used in the dry state, the palatability not being dependent on the addition of water or liquid to release flavor ingredients. Water or other liquids however may be employed, if desired. The examples describe the results obtained by coating, dry animal food kibs with *Torulopsis utilis* and *Saccharomyces cervisiae*.

DETAILED DESCRIPTION OF THE INVENTION

The present invention relates to a dry animal food especially dry animal food kibs of improved palatability. More specifically, the present invention relates to dry animal food kibs such as dog food or cat food having improved palatability.

Problems have been encountered with the prior art canned and dry pet food in that some canned pet food although having good palatability, was low in nutritional value because anywhere from 60–70% of the canned food comprised water and further the ingredients of such canned foods were qualitatively lacking in the nutritive food values essential for sustaining animal health. On the other hand, dry animal food kibs generally have low to poor palatability but are exceptionally high in nutritive value. These kibs are spheres, cylinders or cubes of anywhere from about ⅛ inch to about ¼ inch maximum dimension. The lack of palatability or poor palatability affects animal nutrition in that the animal fed with such food would not consume enough of the food to maintain proper health. Consequently several attempts have been made in the prior art to improve the palatability of dry animal food kibs as set forth in U.S. Pat. No. 3,119,691 Ludington et al. in which the kib has applied to it a coating which forms a gravy containing mixture upon addition of water. The prior art also teaches improvement in the palatability of dry animal food kibs by the addition of liquid beef extract such as beef broth or fish scrap. It has been observed, however, that even with the addition of liquid beef extracts, such as beef broth or fish scrap, to standard commercially prepared dry animal food kibs, the resultant dry animal food kib does not have sufficient palatability to induce an animal to eat sufficient amounts of the animal food to maintain proper nutrition.

One of the difficulties with the prior art dry animal food kibs having a coating which forms a gravy containing mixture on the addition of water was that after the kib had been treated with water the kib would tend to soften after standing about 12 hours, the animal would no longer be interested in the food and, consequently, the food had to be thrown out. Additionally, if the kibs were wet and allowed to stand for a sufficient length of time, the likelihood of spoilage would increase thereby negating the long storage properties of the dry kibs. This would be a particular disadvantage if the animal had to be left food for one or more days. Furthermore, the user of the food had to go to the difficulty or trouble of mixing up the dry animal food kibs with water prior to use which involved an extra step in the preparation of the animal food which detracts from the ready-to-use characteristics of dry food.

An additional problem with the prior art additives to the animal food kibs is that they were extremely low in any nutritive value.

It is therefore an object of the present invention to overcome these and other difficulties of the prior art and especially to provide a process for improving the palatability of dry animal food as well as to provide an article of manufacture comprising such dry animal food having improved palatability.

It is a further objective of the present invention to provide a process for improving the palatability of a dry animal food kib and to provide an article of manufacture comprising such a dry animal food kib having improved palatability.

It is a further object of the present invention to provide a process for improving the palatability of a dry animal food kib and to provide an article of manufacture comprising such a dry animal food kib having improved palatability which does not require the addition of water or any other liquid to obtain such improved palatability.

It is also an object of the present invention to provide a process for improving the palatability of a dry animal food kib and to provide an article of manufacture comprising such a dry animal food kib having improved palatability by means of a product that is high in B vitamins and amino acids.

These and other objects have been achieved by a present invention in which an article of manufacture is provided comprising a dry animal food and especially a dry animal food kib which has been coated with yeast. Yeasts from either the group ascomycetous or asporogenous have been found to be effective in this regard. The yeasts employed in accord with the present invention are further identified in the publication *The Yeasts, A Taxonomic Study* edited by J. Lodder, 1970.

The various genera of yeasts within the group ascomycetous which can be employed according to the present invention include Endomycopsis, Kluyveromyces, Saccharomyces, Saccharomycodes, Saccharomycopsis and Schizosaccharomyces.

The various genera of asporogenous yeasts that can be employed according to the present invention especially asporogenous yeast not belonging to the Sporobolomycetaceae include Candida, Oosporidium and Torulopsis.

The species of yeast in the group asporogenous that can be employed to advantage according to the present invention comprise *Torulopsis utilis* (*Candida utilis*) and *Candida arborea*, *Oospora lactis* (*Oidium lactis*, *Endomyces lactis*, *Geotrichum candidum*).

Because of the commercial usage the term "Torula yeast" or "torula yeast" is employed to designate the species *Torula utilis*, *Torulopsis utilis* and *Candida utilis*, the latter three being treated as synonyms in The Yeasts, supra. The genera Candida and Torulopsis are maintained as separate genera in *The Yeasts, supra* for the reasons stated at pages 894–897 thereof because a reclassification into natural taxa is considered "inadvisable since it would make necessary the provisory renaming of a great number of species. This would inevitably lead to confusion and justified irritation among the increasing number of workers in various fields who use or encounter yeast of this group."

The various species within the group ascomycetous which are also employed to advantage according to the present invention comprise *Saccharomyces cervisiae*, *Saccharomyces cervisiae* variety ellipsoidus *Saccharomyces carlsbergensis* and *Saccharomyces fragilis* (*Kluyveromyces fragilis*).

The genera of yeasts preferred in accord with the present invention comprise Torulopsis, Candida and Saccharomyces.

Commercially available dried yeast which are used according to the present invention includes either primary dried yeast or secondary yeasts which may be classified as follows:

1. Primary dried yeast — *Saccharomyces cerevisiae*
2. Primary dried terula yeast — *Torulopsis utilis* (*Candida utilis*)
3. Secondary yeast, brewer's dried yeast — *Saccharomyces cerevisiae*, *Saccharomyces carlsbergensis*

The composition of commercially available dried primary yeast is given in the 11th Edition of *The National Formulary*, pages 395–396 and is as follows:

| | | |
|---|---|---|
| protein (N × 6.25) | minimum | 45 % |
| thiamine hydrochloride (vitamin B$_1$) | minimum | 120 μg/g |
| riboflavin (vitamin B$_2$) | minimum | 40 μg/g |
| nicotinic acid | minimum | 300 μg/g |
| fermenting power | inactive | |
| fillers | none | |
| total bacterial count | maximum | 7500 μg/g |
| mold count | maximum | 50 μg/g |
| moisture | maximum | 7 % |
| ash | maximum | 8 % |

Primary dried yeasts which are marketed for food usage have the following analysis which is considered typical:

| | | | |
|---|---|---|---|
| moisture | 5.0% | calcium | 0.3% |
| protein | 50.0% | phosphorus | 2.4% |
| fat (ether ext.) | 1.2% | potassium | 2.6% |
| total lipids | 5.5% | magnesium | 0.5% |
| carbohydrates | 31.5% | sodium | 0.4% |
| ash | 8.0% | | |

The amino acid content of primary dried yeast is approximately as follows as expressed as a percent of dried proteins:

| | | | |
|---|---|---|---|
| alanine | 9.0% | lysine | 8.2% |
| arginine | 5.0% | methionine | 2.5% |
| aspartic acid | 4.0% | phenylalanine | 4.5% |
| cystine | 1.6% | proline | 2.5% |
| glutamic acid | 13.5% | threonine | 5.5% |
| glycine | 0.6% | (and serine) | |
| histidine | 4.0% | tryptophan | 1.2% |
| hydroxyproline | 4.5% | tyrosine | 5.0% |
| isoleucine | 5.5% | valine | 5.5% |
| leucine | 8.0% | others | 9.4% |

All essential amino acids are present or can be seen from the above analysis. The vitamin contents of the various products are as follows (in μg/g):

| | |
|---|---|
| thiamine | up to 10,000.0 |
| riboflavin | up to 12,000.0 |
| niacin | up to 30,000.0 |
| pyridoxine | 15.0 |
| pantothenic acid | 110.0 |
| biotin | 2.5 |
| inositol | 4,000.0 |
| choline | 4,000.0 |
| p-aminobenzoic acid | 13.0 |
| folic acid | 11.0 |

Secondary yeasts are those yeasts which are obtained upon the completion of brewery operation or production of alcohol from molasses and rum production, and is then subject to a purification after which it is dried to about 90% solids content and marketed as dried distiller's or dried brewer's yeast.

Primary and secondary brewer's dried yeast have approximately the same analyses.

Secondary brewer's dried yeast analyzes typically as follows:

| | | | |
|---|---|---|---|
| protein | 50.0% | zinc | 38.7 ppm |
| fat | 1.5% | salmonella | negative |
| fiber | 1.5% | coliform | |
| ash | 7.0% | bacteria | negative |
| moisture | 6.0% | thiamine | 56.6 mg/lb |
| nitrogen-free | | riboflavin | 16.0 mg/lb |
| extract | 34.0% | niacin | 225.5 mg/lb |
| calcium | 0.12% | pantothenic | |
| phosphorus | 1.50% | acid | 55.2 mg/lb |
| potassium | 0.86% | pyridoxine | 22.6 mg/lb |
| iron | 0.02% | choline | 2200.0 mg/lb |
| copper | 35 ppm | betaine | 544.0 mg/lb |
| manganese | 5.3 ppm | biotin | 0.5 mg/lb |
| cobalt | 1.5 ppm | folic acid | 22.2 mg/lb |
| | | inositol | 2265.0 mg/lb |

Other yeast which are suitable for the purposes of the present invention comprise vitamin enriched yeasts which are manufactured by the addition of vitamins such as vitamins B1, B2 and B6 to the broth in which the yeast is grown and from which the yeast will subsequently absorb the vitamins. One of the outstanding features of the yeast used in accord with the present invention is they synthesize vitamin B1 in large quantities during production by coupling thiazole and pyrimidine when these compounds are added to the medium in which the yeast is grown. Yeast which are made by the addition of thiazole and pyrimidine and vitamin enriched yeasts manufactured according to U.S. Pat. No. 2,262,735 Schultz, et al., U.S. Pat. No. 2,359,521 Harrison and U.S. Pat. No. 2,328,025 Mead, et al. are also included within the scope of the present invention.

The dry animal food especially the dry animal food kib which is coated according to the present invention comprises a standard commercial dry dog food or dry cat food which is prepared according to processes well known in the art and includes a primary farinaceous ingredient which may be any of the more common grains, such as corn meal, red dog flour, wheat germ and the like. A preferred farinaceous ingredient may include hominy. Commonly this ingredient will be present in amount of from about 30% by weight to about 65% by weight of the total mass.

In the preferred embodiment the dry animal food kib may also include one or more proteinaceous ingredients of vegetable, animal or fish origin, typically soy bean meal, meat meal or fish scrap. This ingredient preferably present in amount of about 20% by weight to about 45% by weight of the total mixture will provide the bulk of the desired protein content in the food product. In the preferred embodiment, the ratio of farinaceous ingredient to proteinaceous ingredient may be from about 2.5:0.8 to about 1:1. The farinaceous ingredient and the proteinaceous ingredient together may comprise from about 50 to about 95% of the total mixture.

Other preferred ingredients in the product (typically present in total amount of about 0.25% to about 6% or 7% by weight) may include: desired flavor ingredients typified by fish scrap (when this material is not used as the prime source of protein) or salt; coloring ingredients including iron oxide etc.; fibrous ingredients typified by beet pulp; and desired vitamins.

A typical dry animal food kib may be prepared from the following mixture.

| Ingredient | Percent |
| --- | --- |
| Farinaceous ingredient- | |
| Wheat flour middlings | 12 |
| Corn germ meal | 10 |
| Hominy feed | 40 |
| Proteinaceous ingredient- | |
| Soy bean meal | 15 |
| Meat meal | 15 |
| Wheat germ meal | 3 |
| Dried milk | 0.9 |
| Fibrous ingredient-Beet pulp | 1.8 |
| Flavor ingredient- | |
| Fish scrap | 0.7 |
| Salt | 0.5 |
| Vitamins, minerals | 4.5 |

The mixture may typically have a moisture content of from about 5% to about 12% by weight. The moisture content of the mixture will be raised preferably to 28–31% and the starch in the mixture may be partially gelatinized. The moisture content may be raised by adding cold water, hot water, or steam prior to completion of the partial gelatinization step. Partial gelatinization may be effected by addition of appropriate amounts of water, including steam and by maintaining the mixture about 200° F. typically about 212° F. at about atmosphere pressure from about 30 to about 120 seconds.

The course of the partial gelatinization may be followed by observing the individual starch granules when illuminated by polarized light and viewed through a microscope. As the reaction proceeds, the granules will swell and it will be noted that the so-called Maltese-cross configurations within the granules will substantially entirely disappear. However, in the preferred embodiments there wil be very few, if any, of the starch cells which will have ruptured.

Further treating of the partially gelatinized product includes mechanical working of the material and expanding. Preferably and commonly this is effected in an extrusion operation. During mechanical working, the partially gelatinized, swollen, unruptured particles are subjected to a high degree of mechanical work and shearing. Steam may be employed to control the temperature. The conditions within this high pressure extrusion operation may be such that the temperature is well above about 212° F.; the pressure may be very high.

The gelatinization may be completed under the influence of the pressure and heat and high pressure steam may be injected into the mixture. The product is then extruded from the apparatus through a die of desired shape. Because of the conditions prevailing in the process, including the high temperature and pressures resulting wholly or in part from the mechanical work and in part from the injected high pressure steam, considerable expansion of the product may occur during the extrusion step as the material passes through the discharge orifice.

The degree of expansion of the product may be controlled by regulating the pressure drop across the orifice; preferably this will be done by regulating the back pressure which in turn may be regulated throughout and/or the size and number of holes in the orifice, as well as the moisture content of the material. During the expansion or extrusion, the moisture content of the material may be reduced typically by about 2% to about 5% by weight to a level of about 23% to about 29% by weight.

Expansion from the higher pressure behind the orifice to the lower pressure on the discharge side of the orifice permits attainment of the expanded product which is characterized by comparatively low density and by the presence of a plurality of air holes or pockets uniformly distributed throughout the mass.

The so-extruded or expanded material may be subdivided or cut to desired size or form. If it be desired to produce a relatively smooth-surfaced, highly regular particle, or one which is characterized by ragged and non-uniform appearance, or variations in between, this may readily be effected by varying the conditions of cut. For example, a sharp, closely fitting knife will produce regular particles, while a dull knife spaced from the orifice will tend to tear the particles and give a ragged or irregular product.

The particles of material may be dried from its moisture content of about 23% to about 29% by weight down to a stable moisture content of from about 5% to about 12% by weight especially from about 8% to about 9% by weight. This may typically be effected by heating to elevated temperature less than about 300° F. Preferably the temperature of drying will be about 225° F. to about 275° F. especially about 250° F. and the time of drying will be about 20 minutes to about 5 minutes, preferably about 10 minutes. Drying of the particles may be effected at room temperature, but under these conditions the time of drying might be as long as about 18 hours. The palatability of the product may be undesirably low if the drying is effected at temperatures about or above 300° F.

The so-dried particles may be cooled to ambient temperatures as by contact with a stream of cool air for a period of about 3 to about 5 minutes.

The dry animal food kib prepared as described above as having a stable moisture content of from about 5% to about 12% by weight especially from about 8% to about 9% by weight is then coated with a yeast as defined herein in which the yeast has a moisture content of from about 3 to about 10% by weight of water. The coated dry animal food kib has anywhere from about 0.5 to about 20% by weight of yeast as a coating on the exterior surface of such kib where the aforesaid weight percent of yeast is based on dry yeast i.e. yeast having from about 3 to about 10% by weight of water.

Although the yeast is applied to the dry animal food kib as a dry coating it may also be mixed with a binder, such as fat, e.g. tallow fat, or other edible binders known in the food art such as, starch binders, precooked potato flour, pre-gelatinized starch, pre-gelatinized corn flour or the equivalent thereof, such as polymerized alkylene oxides e.g. ethylene oxide, carrageenins, alginates, locust bean gum, gum karaya, gum tragacanth and guar gum. Carboxymethyl cellulose may also be employed in this regard. When the yeast is employed in combination with a binder anywhere from about 20% to about 80% by weight of yeast to binder may be employed. Alternatively, the yeast may be applied to the dry animal food kib by first moistening the surface of the kib to convert the dry farinaceous material and/or proteinaceous material at the surface of the kib into a semi-moist tacky adhesive substrate onto which the dry yeast may be applied after which the kib thus coated may be dried so that the overall moisture content of the kib will be within the parameters previously noted.

The following example is illustrative.

EXAMPLE

Commercially prepared dry cat food kibs were coated with 10% by weight of primary dried torula yeast, *Torulopsis utilis*, in one instance and in another instance with 10% by weight of primary dried yeast, *Saccharomyces cerevisiae*, the weight per cent of the coating in both instances being based on the weight of the dry cat food kibs. The yeast employed in each instance had a moisture content of about 7% by weight.

The coating in each instance was applied by placing the yeast in the bottom of a container and adding a weighed amount of dry animal food kibs thereto and rotating the container until all dry cat food kibs were coated. It was observed that the dried yeast adhered to or was in place on the surface of the dry cat food kibs due in part to the porosity of the kibs or various interstices on the surface of the kibs into which the smaller particles of dried yeast were adhered, trapped or held. The porous nature of the surface of the dry cat food kibs traps the dry yeasts in a manner sufficient to contain the yeast as a surface coating.

A four ounce portion from a freshly opened package of the same dry cat food kibs which were not coated with dry yeast was placed in an animal feeding dish and presented to a common house cat for three days and was only partially eaten i.e. an estimated one ounce portion was eaten by the animal. Upon presenting the animal a two ounce portion of dry cat food kibs coated with primary dried torula yeast as described in this example the coated kibs were immediately consumed by the animal. Prior to presenting the coated kibs, the animal was regularly fed table scraps as a supplement to the uncoated kibs so that the animal was not unduly hungry when given the coated food kibs i.e. an ordinary food regimen was maintained to assure that the animal was not excessively hungry when presented with the coated dry cat food kibs. The same results were obtained with the kibs coated with the primary brewer's dried yeast as described in this example i.e. *Saccharomyces cervisiae*.

In another experiment, approximately three ounces of dried cat food kibs that had been presented continuously to a common house cat for three days and which were not consumed were coated with 10% by weight of dried (8% water by weight) secondary brewer's yeast, *Saccharomyces cervisiae*, in the manner previously described. When the coated kibs were presented to the animal they were completely consumed. Again the animal was fed with supplementary table scraps for the aforementioned 3 day period so that it would not be unduly hungry when presented with the yeast coated dry cat food kib. In all examples herein, the animal had continuous access to the uncoated dry cat food for the 3 day period described.

It can be seen by employing the article of manufacture of the present invention that a dry animal food kib can be prepared which has improved palatability and additionally the compound for enhancing the palatability of the dried animal food kibs is high in essential B vitamins as well as proteins. It is unexpected that a compound which is high in nutritive value also imparts improved palatability to the dry animal food kibs. It is also unexpected that improved palatability for a dry animal food kib employed for the nutrition of dogs or cats is obtained with a non-meat source such as the yeasts employed according to the present invention. According to the prior art methods, meat extracts were employed such as beef broth or other beef extracts and fish scrap or fish extracts in order to improve the palatability of the dry animal food kib.

It is also a great advantage to employ the present invention for feeding common house pets such as cats and dogs in that the improved palatability is obtained without having to wet the dry animal food kib prior to use, the food being capable of being presented to the animal in large palatable amounts without subsequent alteration of the particle from a crisp solid particle to a mushy particle which occurs after the kibs are left standing for several hours after being wet. Retention of dry hard particle integrity is also of some value in the nutrition of some animals because of the beneficial effect such a dry particle has on the teeth and gums. It is known that dental hygiene of the animal is improved if hard foods comprise a portion of the diet and by employing the present invention there is assurance that the food will remain in its hard, dry state for longer periods of time than with prior art dry animal food kib to which water is added. Additionally there is no waste by employing the present invention since it is unlike dry animal food left standing for several hours to which liquid has been added in that it does not soften and become unappetizing and has to be thrown out. Additionally it is also known that putrefaction and decomposition of the dry animal food kib will occur more quickly when the moisture content is raised and it can be readily appreciated that by using the present invention these problems of the prior art are avoided, i.e. large quantities of the dry food can be continuously presented to the animal for long periods of time as a dry food without danger of softening or spoilage due to the addition of water and still retain palatability.

Various ranges have been employed throughout the specification to describe the various parameters of the invention however it is intended that where a range of properties is given that this range is to include any range falling within the range as well as any individual value within the range including but not limited to, for example, the amount of farinaceous material in the animal food kib which is described as from about 30 to about 65% by weight by which it is intended that a narrower range within this broad range is also to be included such as from about 35 to about 60%, from about 40 to about 55% by weight as well as any individual value falling within the broad range such as 31%, 39%, 64% by weight and the like. Similarly the yeast coating is described as from about 0.5% to about 20% by weight of the dry animal food kib and again a narrower range such as about 1% to about 12%, about 5% to about 10% by weight as well as any single value within the range such as 7.5%, 15% and the like are intended to be included within this range. As a further example, the moisture content of the yeast employed is given as anywhere from about 5% to 10% by weight and again the range is intended to include a narrower range within the range such as from about 6 to about 8% and any value falling within the range such as 7%, 9% and the like. Similarly, the moisture content of the dry animal food kib is given from between about 5% to about 12% by weight and again a narrower range or any value falling within this range is intended such as from about 8% to about 9% by weight. This definition of the ranges of values is also to include the ratio of yeast to binder if the binder is optionally employed as well as temperature and pressure ranges and the like and every other value given in the specification as a parameter or a set of parameters for practicing the invention set forth herein.

Although the invention has been described by reference to some preferred embodiments it is not intended that the novel article of manufacture and the method for making the same be limited thereby but that certain modifications are intended to be included within the broad scope of the preceding disclosure and the following claims.

What is claimed is:

1. A process for improving the palatability of dry cat food kibs comprising coating said kibs with from about 0.5% to about 20% by weight of a dry yeast selected from a member of the group consisting of ascomycetus yeasts and asporogenous yeasts said dry cat food kib comprising from about 30% to about 65% by weight of farinaceous material and from about 25% to about 40% by weight of proteinaceous material and feeding said coated cat food kibs to a cat.

2. The method of claim 1 where said yeast is selected from one member of the group consisting of the genera Endomycopsis, Kluyveromyces, Saccharomyces, Saccharomycodes, Saccharomycopsis, Schizosaccharomyces, Candida, Oosporidium and Torulopsis.

3. The method of claim 1 where said yeast comprises Candida.

4. The method of claim 1 where said yeast comprises Torulopsis.

5. The method of claim 4 where said yeast comprises *Torulopsis utilis*.

6. The method of claim 1 where said yeast comprises Saccharomyces.

7. The method of claim 6 where said yeast comprises Saccharomyces cerevisiae.

* * * * *